July 4, 1967   G. A. WOOD, JR   3,329,373
FISHING REEL AND BRAKE

Filed June 24, 1964   2 Sheets-Sheet 1

INVENTOR
GARFIELD A. WOOD, JR.

BY Lane, Aitken, Dunner & Ziems
ATTORNEYS

July 4, 1967 G. A. WOOD, JR 3,329,373
FISHING REEL AND BRAKE

Filed June 24, 1964 2 Sheets-Sheet 2

INVENTOR
GARFIELD A. WOOD, JR.

BY
ATTORNEYS

3,329,373
FISHING REEL AND BRAKE
Garfield A. Wood, Jr., 4565 Sabal Palm Road,
Bay Point, Miami, Fla. 33137
Filed June 24, 1964, Ser. No. 377,591
6 Claims. (Cl. 242—84.44)

The present invention relates to fishing reels and more particularly to an adjustable brake mechanism for a fishing reel.

It is one object of the invention to provide a fishing reel adapted to interchangeably receive either a hydraulic brake mechanism or a mechanical brake mechanism which can be adjusted to help fight a fish.

It is another object of the invention to provide a spinning reel having a brake mechanism mounted between the handle actuated drive mechanism for winding in the line and the spool in a manner to provide a compact and efficient fishing reel design.

It is a still further object of the invention to provide a fishing reel having a brake mechanism mounted in the position described above in a manner to facilitate interchanging a mechanical brake mechanism and a hydraulic brake mechanism.

It is a still further object of the invention to provide a clutch mechanism for drivingly connecting the handle of the fishing reel to the elements to be actuated thereby which automatically disengages itself when the handle is released and automatically engages itself when the handle is rotated to reel in the line.

It is a still further object of the invention to provide a hydraulic brake mechanism for a fishing reel comprising a closed hydraulic system including a pump wherein the fluid is pumped in one direction when a fish runs out the line in a manner to build up fluid pressure to produce a braking action, and wherein the fluid freely circulates in the opposite direction when the handle is rotated to reel in the line.

Other objects and features of novelty of the present invention will be specifically pointed out or will otherwise become apparent when referring, for a better understanding of the invention, to the following description taken in conjunction with the accompanying drawings, wherein.

Figure 1:
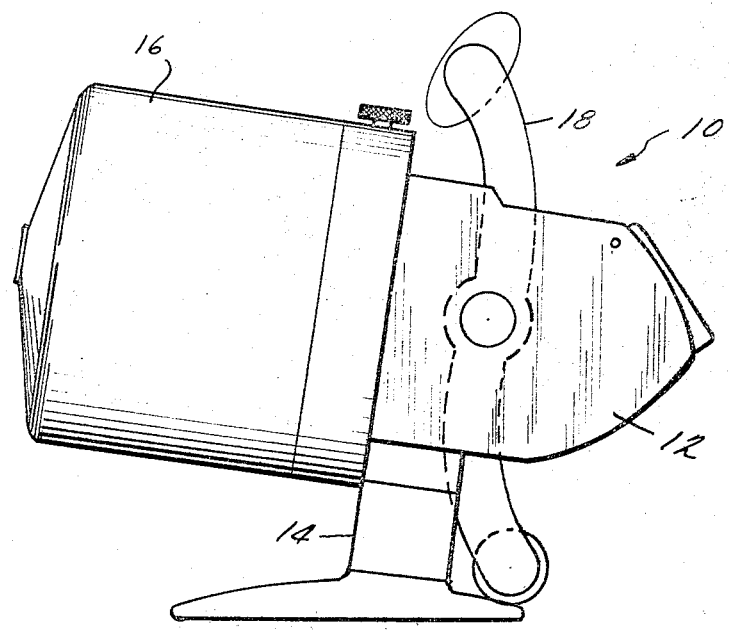
FIG. 1 is a side view of a fishing reel embodying features of the present invention.

Referring to FIG. 1, a closed face spinning reel 10 illustrating features of the invention is shown which comprises a housing 12 having a support 14 projecting downwardly therefrom for mounting the reel 10 on a fishing rod. A cover 16 encloses the spool of the reel in a conventional manner, and a handle 18 is rotatably mounted on the housing 12 for simultaneously reciprocating the spool and rotating the pickup element within the cover 16 as will be described.

Figure 2:
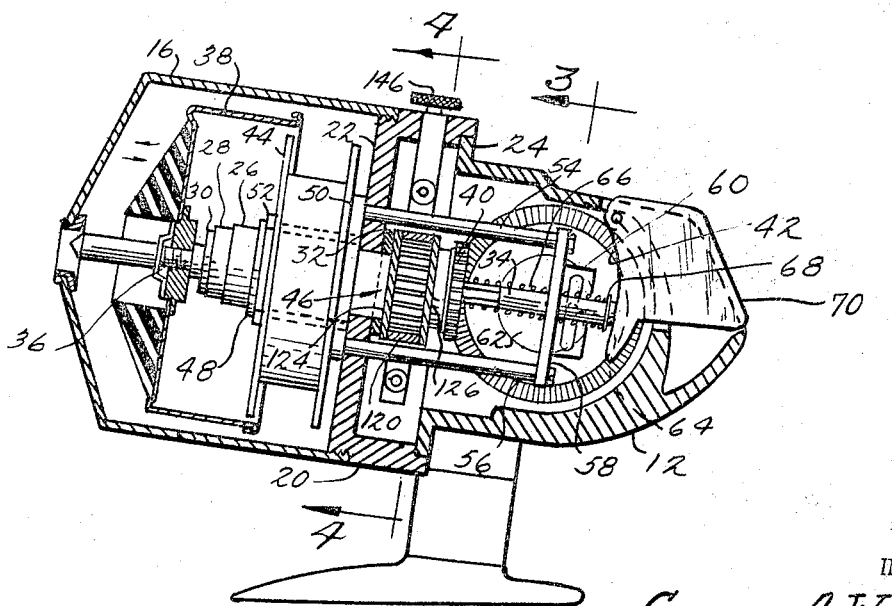
FIG. 2 is a sectional view of the structure illustrated in FIG. 1.

Referring specifically to FIG. 2 it will be observed that the cover 16 is threadably mounted on the left end of a cylindrical body 20 having one end closed by an end wall 22. The open end of the circular body is mounted on a flanged portion 24 of the housing 12 by suitable bolts (not shown). A sleeve 26 having a reduced end portion 28 with a conventional spiral cam 30 on the end face thereof is fixed on the wall 22 in a suitable manner, such as by a nut 32, a shoulder being provided on the sleeve 26 to bear against the left face of the end wall 22 to lock the sleeve in position.

A shaft 34 extends through and is journalled in the sleeve 26 for rotation and slidable movement relative thereto. The forward end of the shaft 34 has a threaded end portion 36 and a conventional pickup element 38 is threadably mounted thereon. A gear 40 is slidably keyed to the shaft 34 in position to mesh with a ring gear 42 rotatably driven by the handle 18 as will be described. When the gear 40 is rotated by the handle 18, the shaft 34 rotates the pickup element 38 about a spool 44. A gear pump 46 is positioned between the gear 40 and end wall 22 to provide a braking action as will be described in detail hereinafter. The sleeve 48 has an enlarged flange 50 on the right end thereof and a snap ring 52 on the left end thereof to fix the spool axially on the sleeve and a set screw (not shown) is provided for fixing the spool against rotation relative to the sleeve 48. A pair of pins 54 and 56 are fixed to the flange 50 and slidably project through the end wall 22. The other ends of the pins are interconnected by a bar 58 having a slotted flange 60 projecting therefrom in position to overlie a disk 62 having an eccentric pin 64 projecting into the slotted flange. The disk 62 is rotated by the handle as will be described so that the pin and slot connection reciprocates the spool 44 as the pickup element 38 rotates about the spool.

The right end of the shaft 34 projects freely through the bar 58 and a coil spring 66 is positioned thereabout between the gear 40 and a snap ring 68 on the end of the shaft. The spring 66 normally retracts the shaft 34 to the position illustrated. A conventional push button 70 is pivotally mounted in a recess on the housing 12 in position to advance the shaft 34 and pickup element 38 forwardly to trap the fishing line against the cover 16 in a conventional manner. A conventional spring-biased plunger (not shown) is mounted on the pickup element 38 in position to cooperate with the spiral cam 30 and the reduced end portion 28 of the sleeve 26 to enable the spring 66 to automatically retract the pickup element in response to rotation of the handle in a conventional manner well known to those skilled in the art.

Figure 3:
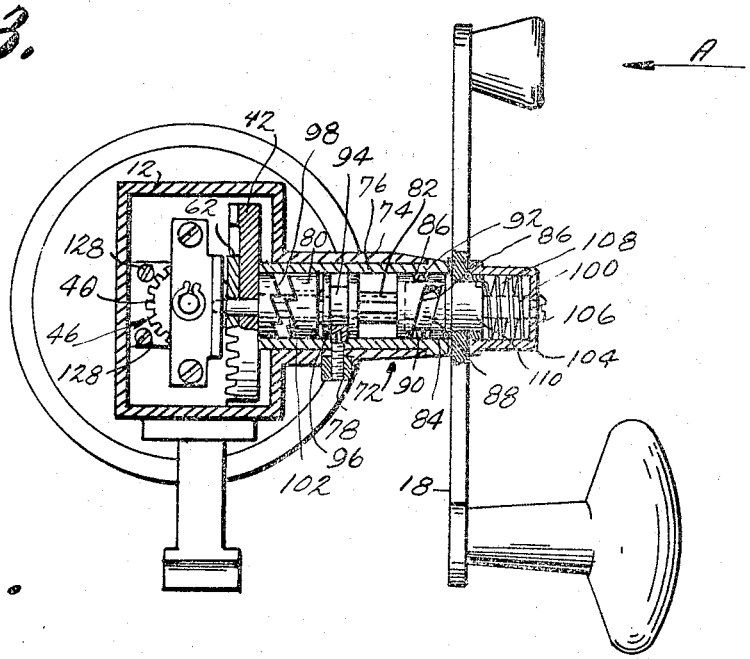
FIG. 3 is a sectional view taken along the line 3—3 of FIG. 2 with some of the elements, and portions of others, not shown in section.

In accordance with the present invention a clutch mechanism 72 is provided as best seen in FIG. 3 for rotatably driving the ring gear 42 in response to rotation of the handle 18. When the handle is released, the clutch mechanism automatically disengages itself to enable the ring gear 42 to rotate freely relative to the handle. In this position the handle is released so that the pickup element is free to rotate to enable the fishing line to be run out by a fish subject to the braking force produced by the gear pump 46 as will be described.

The clutch mechanism 72 is contained within an elongated boss 74 formed integrally with and projecting from the side of the housing 12. A bearing sleeve 76 is fitted within the boss 74 and fixed against movement relative thereto by a set screw 78. A driving clutch element 80 having clutch teeth on the left end thereof is journalled in the sleeve 76 and fixed to the left end of a hexagonal sleeve 82. The right end of the hexagonal sleeve 82 is fixed to the bottom wall of a cup shaped camming element 84 having a pair of spiral cam slots 86 formed in the cylindrical wall thereof. The camming element 84 and driving clutch element 80 rotatably and slidably support the hexagonal sleeve 82 within the bearing sleeve 76.

The handle 18 is fixed on a sleeve 88 having the left end thereof rotatably positioned within the camming element 84 and interlocked with the camming element by a pair of camming pins 90 and 92 which project into the camming slots 86. With this construction the handle 18 the free to rotate relative to the camming element 84 slightly less than one-half of a complete turn. A spool-like element 94 is slidably keyed to the hexagonal sleeve 82 between the camming element 84 and the driving clutch element 80 and is fixed against axial movement by a reduced end portion on the set screw 78 which projects into the groove defined by the flanges of the spool-like element. A small ring 96 of a suitable low friction material such as nylon is preferably fixed on the reduced end portion of the set screw 78 and fits within the groove with a snug fit under a pressure determined by the set screw so as to retain the spool-like element 94 against rotation with a small force which can be overcome easily by rotating the handle 18. Thus, when the handle 18 is rotated by the fisherman to wind in the line, the ring 96 will initially retain the spool-like element 94 against rotation which, in turn, prevents rotation of the hexagonal sleeve 82, the driving clutch element 80 and the camming element 84. Therefore the camming pins 90 and 92 which rotate with the handle 18 will cooperate with the camming slots 86 to shift the camming element 84 and driving clutch element 80 to the left until the camming pins engage the other ends of the camming slots. At this point the driving clutch element 80 will be engaged with a driven clutch element 98 fixed on the back face of the ring gear 42, and continued rotation of the handle 18 will overcome the slight resistance of the ring 96 to rotate the ring gear 42.

The disk 62 having the eccentric pin 64 projecting from the face thereof is fixed to the left end of the shaft 100 which extends through the clutch mechanism 72 and the handle 18. An intermediate portion 102 of the shaft 100 is formed with a hexagonal cross-section which extends at least partially into the hexagonal sleeve 82 to slidably key the shaft 100 to the sleeve 82. The left end of the hexagonal portion 102 of the shaft provides a shoulder bearing against the right face of the ring gear 42 to prevent the ring gear and disk 62 from moving axially relative to one another without interfering with relative rotation between the shaft and ring gear.

An end cap 104 is suitably fixed on the right end of the shaft 100, such as by a screw 106, and a spring 108 is positioned within the end cap 104 with the left end thereof fixed to the end of the sleeve 88 and the right end thereof fixed to the end cap 104. The purpose of the spring 108 is to provide a counter-clockwise biasing force on the handle 18 when viewed from the direction of the arrow A in FIG. 3. Thus, when the handle 18 is released by the fisherman, the ring 96 initially retains the spool-like element 94 against rotation as previously described, and the spring 108 rotates the handle slightly less than one-half of a complete turn in a counter-clockwise direction until the camming pins 90 and 92 engage the ends of the camming slots 86 as illustrated in FIG. 3 to prevent further counter-clockwise rotation of the handle 18. During this rotary movement the camming element 84 is cammed to the right to shift the driving clutch element 80 to its disengaged position. As previously explained, the ring gear 42 and the pickup element 38 are free to rotate in this position wherein the clutch elements are disengaged subject to the braking action provided by the gear pump 46 as will be described. Conversely, when the handle 18 is rotated in a clockwise direction by the fisherman, the camming element 84 is cammed to the left to engage the driving clutch element 80 with the driven clutch element 98 so that the further rotation of the handle 18 rotates the ring gear 42 directly.

Figure 4:
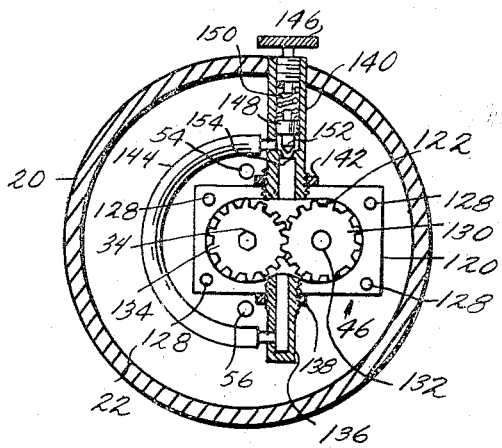
FIG. 4 is a sectional view taken along the line 4—4 of FIG. 2.

Referring specifically to FIGS. 2 and 4, the gear pump 46 comprises a flat rectangular body 120 having a pumping chamber 122 formed therein. Cover plates 124 and 126 are mounted on opposite faces of the body 122, such as by bolts 128, to enclose the pumping chamber 122. An idler gear 130 is journalled between the plates 124 and 126 by a stub shaft 132, and a second gear 134 is keyed to the hexagonal portion of the shaft 34 so as to rotate therewith in response to rotation of the handle 18. A sleeve-like fitting 136 is threadably connected to the inlet or low pressure port of the gear pump and locked in position by a lock nut 138. Another fitting 140 is threadably connected to the outlet or high pressure port of the gear pump and locked in position by a lock nut 142.

A piece of tubing 144 is suitably connected between the fittings 140 and 136 to communicate the high pressure port with the low pressure port to recirculate the fluid being pumped. The tubing 144 is preferably made of a flexible, expandable material such as neoprene to compensate for changes in volume of the fluid caused by temperature variations. An adjusting knob 146 is threadably mounted in the upper end of the fitting 140 and a free floating piston 148 is positioned within the fitting with a spring 150 interposed therebetween to continuously bias the free floating piston 148 downwardly with a spring force determined by the knob 146. A conical valve element 152 projects downwardly from the free floating piston 148 in position to cooperate with a frusto-conical valve seat 154 formed in the fitting 140 just beneath the point at which the tubing 144 is connected to the fitting. The force of the spring 150 normally retains the valve element 152 seated to prevent flow of fluid from the high pressure port through the tubing 144 to the low pressure port. However, when the gear 134 is rotated in a counter-clockwise direction in response to a running fish taking line, the fluid pressure on the high pressure side of the pump increases, and when a sufficient pressure is built up to overcome the pressure of the spring 150, the valve element 152 will lift off its seat to allow the fluid to circulate through the tubing 144 to the low pressure port. The point at which this will occur is determined by the setting of the knob 146 which controls the pressure applied by the spring 150. Should the fluid pressure build up suddenly due to a rapid rotation of the gear 134, the valve element 152 will lift further off the seat to enable the fluid to flow more freely. Thus, when the handle 18 is released by the fisherman, the fish is free to run out the line (since the pickup element 38 is free to rotate) subject only to the braking force applied by the gear pump 46. By adjusting the setting of the knob 146 the fisherman can easily control this braking force while fighting the fish.

When the handle 18 is rotated to reel in the line, a direct driving chain is established so that the fisherman can reel in the fish with as strong a force as he can apply to the handle. This is contrasted to most prior art reels in which the line is reeled in through a slip clutch or brake so that the maximum pull that can be exerted on the line is determined by the slip clutch or brake.

When the gear 134 is rotated in a clockwise direction, fluid pressure acts through the tubing on the lower annular face of the floating piston 148 to lift the valve element off of the seat. In view of the much larger area of the piston on which the fluid acts in this direction as compared to the fraction of the area of the conical tip of the valve element on which it acts when circulated in the opposite direction, the valve element opens at a much lower fluid pressure. Consequently, the gear pump offers a negligible resistance to the rotation of the handle 18 by the fisherman.

Figure 5:
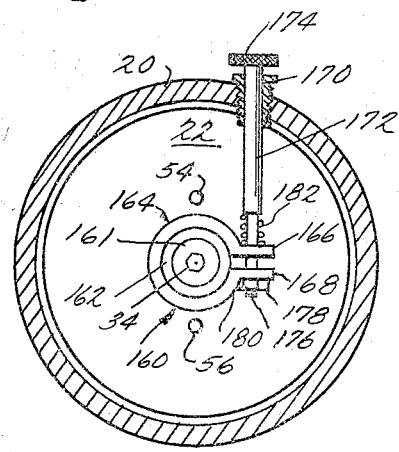
FIG. 5 is a sectional view similar to that of FIG. 4 illustrating another embodiment of the invention.

By mounting the gear pump 46 on the end wall 22 of the cylindrical body 20 forwardly of the pinion gear 40, a simplified and more compact construction requiring fewer alterations in a conventional fishing reel can be realized as compared to the various types of hydraulic brake mechanisms disclosed in my copending application Ser. No. 228,163, filed on Oct. 3, 1962, and entitled Hydraulic Fishing Reel, now Patent No. 3,255,981. Also by mounting the gear pump directly on the end wall 22, a simple mechanical brake easily can be substituted for the hydraulic brake as illustrated in the embodiment of FIG. 5. The mechanical brake 160 comprises a conventional one-way drive mechanism having an inner race 161 keyed to the hexagonal portion of the shaft 34 in place of the gear 134 of the gear pump, and an outer race 162 drivingly connected to the inner race by an LGS spring, or the like, so that the outer race will rotate with the inner race in a clockwise direction but can be held against rotation when the inner race is rotated in a clockwise direction. A brake band 164 preferably made of a suitable low friction material such as nylon encircles the outer race 162 and is provided with parallel spaced apart flanges 166 and 168 which can be squeezed together to exert a braking pressure on the outer race 162. A threaded sleeve 170 is fixed in the aperture in the cylindrical wall 20 through which the fitting 140 previously extended, and an elongated bolt 172 having a knurled knob 174 on one end thereof and a reduced threaded end portion 176 on the other end thereof is slidably and rotatably journalled in the sleeve 170. The reduced threaded end portion 176 extends through the flanges 166 and 168 and a nut 178 is fastened thereon below the flange 168, a flat 180 being provided on the side of the nut facing the brake band to prevent the nut from rotating. A spring 182 is positioned about the reduced end portion 176 above the flange 166 to resiliently bias the flanges together with a force determined by the compression of the spring which, in turn, is controlled simply by rotating the knob 174. Thus, the knob 174 provides a convenient means for adjusting the mechanical braking pressure provided by the brake band 164 to assist in fighting a running fish. Of course, when the fish runs out the line, the shaft 34 is rotated in a counter-clockwise direction and both the inner and outer races 161 and 162 of the one-way drive mechanism rotate with the shaft against the braking force exerted by the brake band 164. When the handle 18 is rotated by the fisherman, the outer race is held against rotation by the brake band, and the inner race 161 rotates freely in a clockwise direction with the shaft 34 so that no braking force is applied to oppose rotation of the handle 18.

With the fishing reel construction described above, it is apparent that the same fishing reel can be provided with either the less expensive mechanical brake 160 or with the more sophisticated hydraulic brake provided by the gear pump 46.

While it will be apparent that the embodiments of the invention disclosed herein are well calculated to fulfill the objects of the invention, it will be appreciated that the invention is susceptible to modification, variation and change without departing from the proper scope or fair meaning of the subjoined claims. For example, other types of mechanical brakes or hydraulic brakes could be substituted for the embodiments disclosed in FIGS. 4 and 5. Specifically, the gear pump illustrated in FIG. 3 of my co-pending application having the internal ring gear driven by the pinion gear positioned eccentrically within the ring gear could be used in place of the gear pump 46. Should the spacing between the pins 54 and 56 be too close to accommodate this type of gear pump therebetween, one of the pins could slidably extend through the portion of the pump housing overlying the crescent shaped member positioned between the teeth of the eccentric driving gear and the internal ring gear to eliminate any sealing problems. Also if desired the gear 134 can be connected to the shaft 34 (FIG. 4) by a suitable one-way drive mechanism so as to rotate with the shaft in a counter-clockwise direction when a fish is running out the line, and to allow the shaft to rotate freely relative to the gear in a clockwise direction when the handle is rotated to reel in the line. This construction would completely eliminate any fluid resistance to the rotation of the handle.

What is claimed is:

1. In a fishing reel having a spool element and pickup element rotatable relative to one another, shaft means projecting axially from said spool element for rotating one of said elements, drive means including a handle for rotating said shaft means in one direction to wind a fishing line on the spool, said shaft means being rotatable in the opposite direction by a running fish taking line, said drive means including a pinion gear keyed to said shaft means, and brake means for resisting rotation of said shaft means in said opposite direction comprising a rotatable element mounted on said shaft means between said gear and spool for rotation with the shaft in at least said opposite direction, and means for braking rotation of said rotatable element in said opposite direction, said brake means comprises hydraulic brake means having the fluid thereof pressurized by rotation of said rotatable element in said opposite direction.

2. The invention as defined in claim 1 wherein said drive means includes clutch means for automatically engaging said handle with said drive means whenever the handle is rotated in said one direction and automatically disengaging said handle from the drive means as soon as the fisherman releases the handle.

3. The invention as defined in claim 1 wherein said hydraulic brake means comprises a pump having two meshed gears, one of said gears being formed by said rotatable element, means for recirculating fluid from the high pressure side of said pump to the low pressure side thereof, and adjustable valve means for controlling the fluid pressure developed by the pump.

4. In a fishing reel having a spool element and pick-up element rotatable relative to one another, shaft means projecting axially from said spool element for rotating one of said elements, drive means including a handle for rotating said shaft means in one direction to wind a fishing line on the spool, said shaft means being rotatable in the opposite direction by a running fish taking line, said drive means including a pinion gear keyed to said shaft means, and brake means for resisting rotation of said shaft means in said opposite direction comprising a rotatable element mounted on said shaft means between said gear and spool for rotation with the shaft in at least said opposite direction, and means for braking rotation of said rotatable element in said opposite direction, said drive means comprising a drive gear meshing with said pinion gear, a first clutch element fixed for rotation with said drive gear, a clutch shaft mounted on said reel for rotation and axial sliding movement relative thereto, a second clutch element mounted for rotation with said clutch shaft and movable into and out of engagement with said first clutch element by axial movement of the clutch shaft, means for resisting rotation of said clutch shaft with a predetermined force, a first camming element fixed to said clutch shaft, a second camming element fixed to said handle, said camming elements cooperating with one another to enable said handle to rotate relative to said clutch shaft through a limited angle and to cam said clutch shaft axially in response to relative rotation between said handle and clutch shaft, said handle rotatably driving said clutch shaft in at least one direction when rotated beyond said limited angle, and means for continuously biasing said handle in a direction to disengage the camming elements.

5. In a fishing reel having a spool element and pickup element rotatable relative to one another, shaft means projecting axially from said spool element for rotating one of said elements, drive means including a handle for rotating said shaft means in one direction to wind a fishing line on the spool, said shaft means being rotatable in the opposite direction by a running fish taking line, said drive means including a pinion gear keyed to said shaft means, and brake means for resisting rotation of said shaft means in said opposite direction comprising a rotatable element mounted on said shaft means between said gear and spool for rotation with the shaft in at least said opposite direction, and means for braking rotation of said rotatable element in said opposite direction, said drive means comprising a drive gear meshing with said pinion gear, a first clutch element fixed for rotation with said drive gear, a clutch shaft mounted on said reel for rotation and axial sliding movement relative thereto, a second clutch element fixed on said clutch shaft and movable into and out of engagement with said first clutch element by axial movement of the clutch shaft, means slidably keyed to said clutch shaft for frictionally resisting rotation thereof with a predetermined force, a first camming element fixed to said clutch shaft, a second camming element fixed to said handle, said camming elements being interlocked with one another to enable said handle to rotate relative to said clutch shaft through a limited angle and to cam said clutch shaft axially in response to relative rotation between said handle and clutch shaft, said handle rotatably driving said clutch shaft in at least one direction when rotated beyond said limited angle, and means for continuously biasing said handle in a direction opposite to said one direction to normally disengage the camming elements.

6. The invention as defined in claim 5 including a shaft extending through and slidably keyed to said clutch shaft, one end of said shaft extending through and journalled in said drive gear for rotation relative thereto, a disc fixed on said one end of said shaft, an eccentric pin projecting axially from said disc, the other end of said shaft projecting freely through said first and second cam elements and handle, said biasing means comprising a coil spring having one end thereof fixed to said handle and the other end thereof fixed to said other end of the shaft, and means driven by said pin for reciprocating said spool and pickup elements relative to one another in response to rotation of said handle.

References Cited

UNITED STATES PATENTS

| | | | |
|---|---|---|---|
| 890,892 | 6/1908 | Douglass | 242—84.54 |
| 1,547,238 | 7/1925 | Russell et al. | 242—84.44 |
| 1,995,221 | 3/1935 | Peel et al. | 242—84.5 |
| 2,180,566 | 11/1939 | Thompson | 242—84.51 |
| 2,813,601 | 11/1957 | De Bourgues. | |
| 2,858,087 | 10/1958 | Giamio | 242—84.21 |
| 2,918,227 | 12/1959 | Mauborgne | 242—84.21 |
| 3,034,604 | 5/1962 | Holmes | 242—84.5 X |
| 3,093,340 | 6/1963 | Mauborgne | 242—84.21 |
| 3,232,554 | 2/1966 | Johnson | 242—84.54 X |

FOREIGN PATENTS

| | | |
|---|---|---|
| 1,106 | 1912 | Great Britain. |
| 750,587 | 6/1956 | Great Britain. |

STANLEY N. GILREATH, *Primary Examiner.*

FRANK J. COHEN, BILLY S. TAYLOR,

*Examiners.*